United States Patent [19]

D'Angelo

[11] 4,331,172
[45] May 25, 1982

[54] FIRE-SAFE VALVE STRUCTURE
[75] Inventor: John A. D'Angelo, Houston, Tex.
[73] Assignee: ACF Industries, Incorporated, New York, N.Y.
[21] Appl. No.: 187,285
[22] Filed: Sep. 15, 1980
[51] Int. Cl.³ .............................................. F16K 13/04
[52] U.S. Cl. ....................................... 137/72; 137/74
[58] Field of Search ................................... 137/72, 74
[56] References Cited
U.S. PATENT DOCUMENTS

| | | | |
|---|---|---|---|
| 3,177,887 | 4/1965 | Priese | 137/74 |
| 3,843,091 | 10/1974 | Gachot | 137/72 |
| 4,113,268 | 9/1978 | Simmons | 137/72 X |
| 4,160,460 | 7/1979 | Kemp | 137/72 |
| 4,220,172 | 9/1980 | Stager | 137/74 |

Primary Examiner—Harold W. Weakley

Attorney, Agent, or Firm—Stephen T. Belsheim

[57] ABSTRACT

A fire-safe valve structure (10) has a metal seat (52 and 54) with an annular groove (56) therein in which a sealing ring (50) is positioned in face-to-face contact with a valve member (28) movable between open and closed positions. The annular groove (56) has an annular space (66) behind the resilient sealing ring (50) to permit displacement of the sealing ring (50). A shim of fusible material (68), which sublimates at a predetermined temperature, is associated with the annular space (66) and holds the sealing ring (50) in contact with the valve member (28). Upon sublimation of the sublimable material and subsequent passage of the gaseous sublimable material from the annular space (66), the sealing ring (50) is displaced within the annular space (66) and the valve member (28) moves into a tight metal-to-metal contact with the metal seat (52 and 54).

12 Claims, 4 Drawing Figures

FIRE-SAFE VALVE STRUCTURE

BACKGROUND OF THE INVENTION

This invention relates to a valve structure which has a movable valve member that controls fluid flow through a flow passage and is designated particularly for resistance to high temperatures and being subjected to a fire.

In light of the recent emphasis placed upon safety, the utilization of valves which do not leak or fail when subjected to a fire is highly desirable. In pipelines which convey fluid such as petroleum products, a valve must have the capability to be tightly sealed in a closed position, and in the event of fire, the valve member must remain tightly sealed in a closed position even though the valve seals or sealing rings may be destroyed or impaired by fire.

Heretofore, fire-safe valve structures have been provided in which the valve sealing ring which contacts the movable valve member, such as a ball valve member, is backed by a fusible material which prevents displacement of the sealing ring until the material melts at a predetermined temperature and passes through a metering opening. U.S. Pat. No. 4,160,460 issued to Kemp for a "Fire-Safe Valve Structure" on July 10, 1979, is exemplary of this kind of structure. With respect to this type of structure, the incomplete melting of the fusible material or the failure of the fusible material to completely pass through the metering opening has prevented the sealing ring from being pushed completely into the seat pocket. Consequently, the opportunity exists for the sealing ring to interfere with the formation of an effective metal-to-metal seal between the valve member and the valve body. Further, if the downstream sealing ring is not fully pushed into the seat pocket, the valve member may not move a sufficient distance downstream and the upstream sealing ring may not be sufficiently unloaded to evacuate excessive body pressure into the flow pasage. The failure to evacuate excessive body pressure could result in severe damage to the valve. Thus, it would be highly desirable to provide a valve structure wherein the sealing ring is consistently pushed fully into the seat pocket when the valve structure reaches a predetermined temperature.

Production costs associated with a valve structure such as that shown in U.S. Pat. No. 4,160,460 are relatively complicated and costly. The metering openings must be drilled to communicate with the seat pocket, and the fusible material must be positioned in the seat pocket and machined to a proper size therein. Thus, it would be highly desirable to provide a fire-safe valve which can be made without these costly production operations.

SUMMARY OF THE INVENTION

Thus, it is an object of the invention to provide an improved fire-safe valve structure having a sealing ring that is consistently pushed fully into the seat pocket when the valve structure reaches a predetermined temperature. This feature insures that the sealing ring will not interfere with the formation of an effective metal-to-metal seal between the valve member and the valve body. This feature also insures that the valve element will move a sufficient distance downstream so that the upstream sealing ring is sufficiently unloaded and excessive body cavity pressure can then be evacuated into the flow passage.

It is also an object of the invention to provide an improved fire-safe valve structure that can be made without costly production operations like those required to make the valve shown in U.S. Pat. No. 4,160,460.

The present invention is directed to a fire-safe valve structure which has a valve body with a valve member mounted within the valve chamber. An annular groove is about the flow passage and faces the valve member. A resilient sealing ring is mounted in the groove and forms a face seal. The sealing ring is spaced from the bottom of the groove to define an annular space behind the sealing ring so that the sealing ring may be displaced within the space. A sublimable material is positioned within this annular space so as to prevent displacement of the sealing ring. Once the valve structure reaches a temperature at which the sublimable material sublimates, the gaseous form of the material passes out between the sealing ring and seat pocket. The annular space behind the sealing ring is then available to receive the sealing ring, and upon displacement of the sealing ring, a tight metal-to-metal seal is provided between the valve member and the valve body. The temperature at which the sublimable material sublimates to permit contact of the valve member with the valve body may be closely controlled by the present invention and is not dependent upon the particular type or thickness of material which might be employed as the sealing ring in the valve structure.

DETAILED DESCRIPTION OF SPECIFIC EMBODIMENTS

Figure 1:
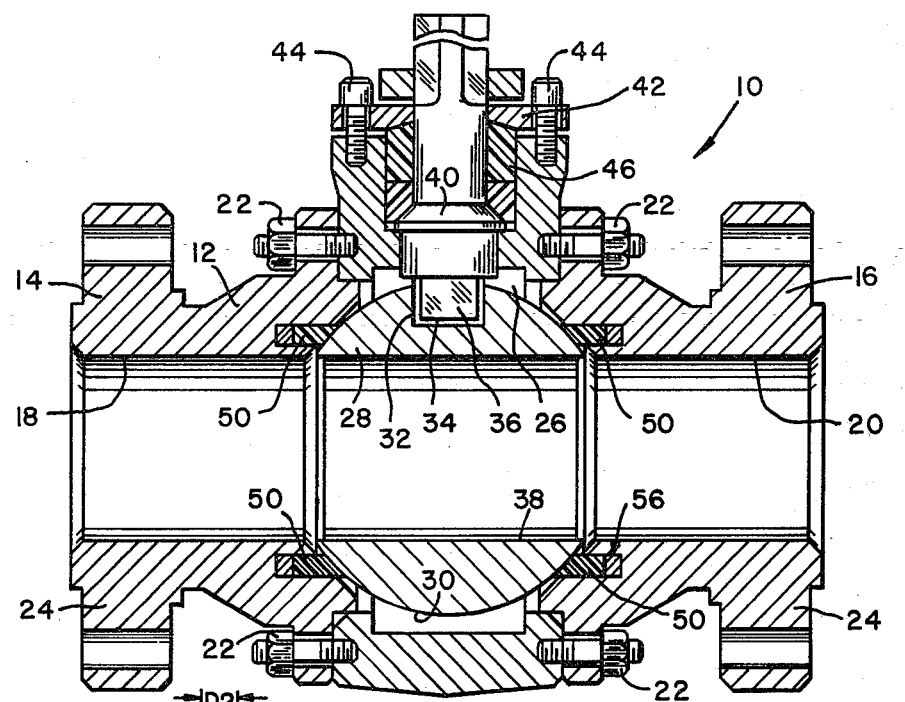
FIG. 1 is a sectional view of one embodiment of the invention comprising a ball valve structure having a sublimable material in a groove behind the sealing ring.
Figure 2:
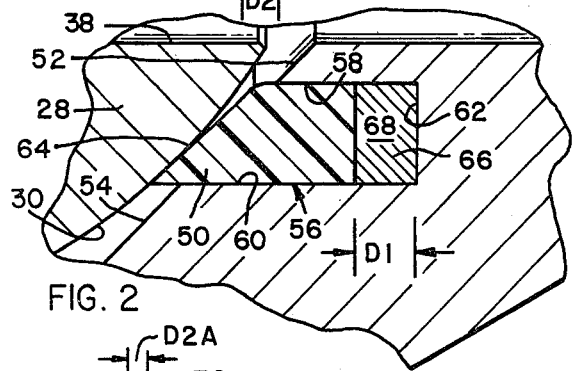
FIG. 2 is an enlarged fragmentary view of FIG. 1 showing the sealing ring in contact with the adjacent ball valve member with the sublimable material behind the sealing ring.
Figure 3:
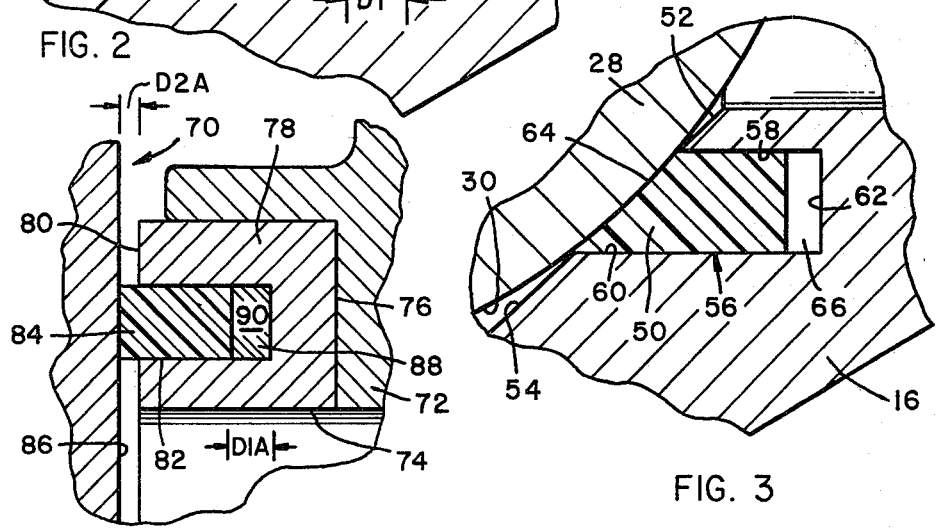
FIG. 3 is an enlarged view similar to FIG. 2 but showing the ball valve member in metal-to-metal sealing contact with the associated valve body after the sublimable material has sublimated and the sealing ring has been displaced into the space in the groove which was previously occupied by the sublimable material.

Referring now to the drawings and more particularly to the embodiment shown in FIGS. 1-3, a ball valve structure is indicated generally at 10 and comprises a body formed from a main body portion 12 and respective inlet and outlet end of body portions 14 and 16. Inlet and outlet end body portions 14 and 16 form respective inlet and outlet flow passages 18 and 20. Studs 22 connect main body portion 12 to end body portions 14 and 16. Flanges 24 are formed on the ends of end body portions 14 and 16, and flanges 24 are adapted for bolting to a pipeline or the like in a conventional manner well known to one skilled in the art. A valve chamber 26 is formed by main body portion 12 between end body portions 14 and 16, and a ball valve 28, which has a spherical outer surface 30, is mounted within valve chamber 26.

Ball valve member 28 has a rectangular slot 32 therein and an elongated end 34 of a stem 36 fits within slot 32. A suitable handle or the like is secured to stem 36 for rotating ball valve member 28 between open and closed positions relative to the inlet and outlet flow passages. A flow passage 38 extends through ball valve member 28 and is adapted to align with the inlet and outlet flow passages in the open position of ball valve member 28. Stem 36 has a flange 40 thereon and a bonnet 42 is secured to the upper end of main body portion 12 by suitable studs 44. A suitable seal and packing combination 46 is positioned between stem 36 and body portion 12.

The inlet and outlet end body portions are generally identical, and for purposes of illustration, only outlet end body portion 16 is described in detail. It should be understood that inlet end body member 14 is arranged in a manner similar to that of outlet end body portion 16.

Outlet end body portion 16 provides a metal seat adapted to engage spherical surface 30 of ball valve member 28 upon displacement of a resilient seal ring 50 which forms a face seal for valve member 28. The metal seat is comprised of an inner seat portion 52 and an outer seat portion 54 on opposite sides of an annular groove indicated generally at 56. Groove 56 is defined by inner and outer circumferential walls 58 and 60, respectively, which are connected by a bottom wall 62. Resilient seal ring 50 is positioned in groove 56. Seal ring 50 has a face 64 which is normally in contact with spherical surface 30 of ball valve member 28 to provide a sealing contact therewith. As shown in FIG. 2, an annular space 66 is formed in groove 56 behind seal ring 50 when seal ring 50 is in sealing contact with ball member 28.

Space 66 forms a material chamber which contains a sublimable material in the form of a shim or ring 68 which may be preferably of a virgin tetrafluoroethylene material. Tetrafluoroethylene is manufactured and sold under the trademark "Teflon" by E. I. du Pont Company, 2533 Nemour Bldg., Wilmington, Del. 19898, and under the trademark "Halon" by Allied Chemical Corporation, P. O. Box 2365R, Morristown, N.J. 07960. The sublimable shim 68 is totally captivated by sealing ring 50 and seat pocket or groove 56. Because shim 68 is totally captivated, it can be exposed to loading with only relatively minimal deformation.

The temperature at which the sublimable material of shim 68 begins to sublimate or thermally degrade at the rate of 0.001 wt./hour is within the range of approximately 400° C. to approximately 420° C. The temperature at which the sublimable material completely sublimates may be varied depending on such factors as, for example, the time the material is exposed to the temperature, and the rate of increase in the temperature. However, complete sublimation of virgin tetrafluoroethylene generally occurs very rapidly within the range of between approximately 480° C. and 540° C. The term "sublimable material" as employed herein is intended to mean a material or substance which changes from a solid to a gaseous state upon reaching a predetermined temperature.

When the predetermined temperature is reached, the sublimable shim 68 vaporizes in a gaseous state and exits annular space 66 by passing between sealing ring 50 and seat pocket 56. Once annular space 66 is vacant, sealing ring 50 is free to move within annular space 66 in response to the downstream movement of ball valve member 28, and the ball valve member 28 is then allowed to move into a metal-to-metal contact with the adjacent seat portions 52 and 54 to form a tight metal-to-metal seal as illustrated by FIG. 3. As is apparent, sealing ring 50 is positioned in annular groove 56 in such a fashion that there exists sufficient space therebetween so that the gaseous sublimable material can pass there between and the sealing ring is slidable within the annular groove. The depth "D1" of annular space 66 must be greater than the distance "D2" that sealing ring 50 will be fully pushed into groove 56 when ball valve member 28 moves into contact with seat portions 52 and 54. Even if sealing ring 50 deteriorates or is consumed by fire or the like, ball valve member 28 will still form the metal-to-metal seal with seat portions 52 and 54.

Further, because sealing ring 50 is fully pushed into groove 56 upon the sublimation and passage of shim 68 from annular space 66, ball valve member 28 is allowed to move downstream a sufficient distance so that the upstream sealing rings 50 are unloaded. Thus, any excessive pressure contained within the body of the valve is allowed to pass into the flow passage. The release of this excessive pressure is a highly desirable feature of applicant's invention since high temperature conditions in the valve frequently cause excessive internal body pressures, and if this pressure is not relieved the valve can be seriously damaged.

Figure 4:
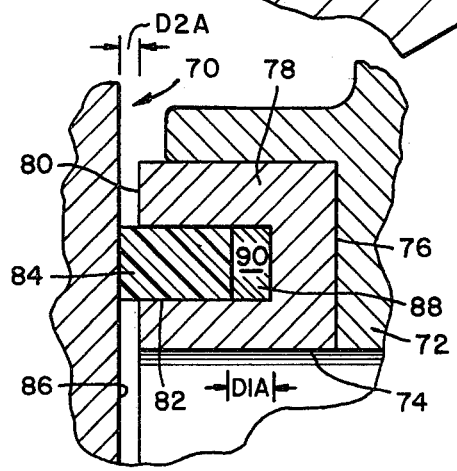
FIG. 4 is an enlarged sectional view of another embodiment of the invention illustrating a gate valve structure in combination with a face seal and associated sublimable material.

Referring now to FIG. 4, the present invention is shown in combination with a gate valve structure in which a gate valve member indicated at 70 is mounted for reciprocation between open and closed positions. A gate valve body shown at 72 has a flow passage 74 that is countersunk to form a seat pocket 76 for receiving a seat ring as shown at 78. Seat ring 78 has a front face 80 and an annular groove 82 therein to receive annular face seal 84 which engages the adjacent face 86 of gate valve member 70. Groove 82 has an annular space 88 therein behind face seal 84 and a shim 90 of sublimable material is provided in annular space 88. The depth "D1A" of annular space 88 must be greater than the distance "D2A" that face seal 84 will be fully pushed into groove 82 when gate valve member 70 moves into contact with seat ring 78.

As in the embodiment of FIGS. 1–3, the sublimation of shim 90 allows face seal 84 to move into seat pocket 76 a sufficient distance so that gate valve member 70 forms a metal-to-metal seal with face 80 of seat ring 76. In addition, gate valve member 76 can move a sufficient distance downstream so as to unload the upstream face seal, and thus, relieve excessive body pressure past the upstream face seal and into the flowline.

Referring to both embodiments, the shim of sublimable material is generally ring-shaped and can be machined or otherwise fabricated to a predetermined thickness and height corresponding to the groove (or seat pocket) and sealing ring (or face seal). The ring-shaped shim is merely fitted into the groove (or seat pocket). This is in contrast to the costly production operations required to position and machine the fusible material of the valve structure shown in U.S. Pat. No. 4,160,460. Further, applicant's invention does not require the drilling of metering openings such as those shown in U.S. Pat. No. 4,160,460.

What is claimed is:

1. A fire-safe valve structure comprising:

a valve body having a flow passage therethrough and a valve chamber, a valve member mounted within said valve chamber for movement between open and closed positions relative to said flow passage, an annular metallic seat about said flow passage having an annular groove facing said adjacent valve member, a sealing ring mounted in said annular groove for contacting said adjacent valve member in sealing relation to provide a face seal and spaced from the bottom of the groove to define an annular space therein behind said sealing ring to permit displacement of said sealing ring into said annular space; and a body of sublimable material positioned within said space, upon reaching a predetermined temperature said body of sublimable material sublimates into a gas and said gas passes between said sealing ring and said annular groove so as to vacate said annular space so that said sealing ring may be displaced into said space and thereby allow said valve member to move into contact with said adjacent metallic seat to provide a tight metal-to-metal seal between said valve member and said adjacent metallic seat.

2. A fire-safe valve as set forth in claim 1 wherein said body of sublimable material is a ring of sublimable material.

3. A fire-safe valve as set forth in claim 1 wherein said valve member is a gate valve member mounted for reciprocal movement between open and closed positions.

4. A fire-safe valve as set forth in claim 1 wherein said valve member is a ball valve member mounted for rotational movement between open and closed positions.

5. A fire-safe valve as set forth in claim 1 wherein said body of sublimable material is comprised of tetrafluoroethylene which completely sublimates at a temperature within a range of between approximately four hundred eighty degrees Centigrade and approximately five hundred forty degrees Centigrade.

6. A fire-safe valve as set forth in claim 1 wherein said body of sublimable material is captive within said space so that said body of sublimable material is in contact with the rear face of said sealing ring, and a bottom and an inner and an outer circumferential wall of said annular groove.

7. A fire-safe valve as set forth in claim 1 wherein the depth of said space is greater than the distance said sealing ring moves in response to the formation of a metal-to-metal seal between said valve member and said metallic seat.

8. A fire-safe valve structure comprising:

A valve body having a flow passage and a valve chamber, a valve member mounted within said valve chamber for movement between open and closed positions relative to said flow passage, a generally rigid annular seat about said flow passage having an annular groove adjacent said valve member, said annular groove being defined by oppositely disposed inner and outer circumferential walls joined by a bottom wall;

a sealing ring mounted in said annular groove in a spaced relationship with said bottom wall to define an annular space behind a rear face of said sealing ring, said sealing ring being movable between a first position in which said sealing ring contacts said adjacent valve member in sealing relation to provide a face seal and a second position in which said sealing ring is displaced within said annular groove in response to the movement of said valve member into contact with said annular seat; and a ring of sublimable material positioned within said annular space so as to prevent said sealing ring from moving from the first position to the second position when said ring is solid, when said ring reaches a predetermined temperature said ring sublimates into a gas and said gas passes between said sealing ring and said annular groove so as to vacate said annular space so that said sealing ring may move into the second position.

9. A valve structure as set forth in claim 8 wherein said valve member is a gate valve member mounted for reciprocal movement between open and closed positions.

10. A valve structure as set forth in claim 8 wherein said valve member is a ball valve member mounted for rotational movement between open and closed positions.

11. A valve structure as set forth in claim 8 wherein said sublimable material sublimates at a temperature within a range of between approximately four hundred eighty degrees Centigrade and approximately five hundred forty degrees Centigrade.

12. A valve structure comprising:

a valve body having a valve chamber, an upstream flow passage and a downstream flow passage communicating with said valve chamber, a valve member mounted within said valve chamber for limited displacement axially of said flow passages and for movement between open and closed positions relative to said flow passages;

an annular metallic upstream seat about said upstream flow passage adjacent said valve member, an upstream sealing ring associated with said upstream seat and normally maintained in contact with said valve member in sealing relation therewith to provide an upstream face seal, an upstream annular space behind said upstream sealing ring;

an annular metallic downstream seat about said downstream flow passage adjacent said valve member, a downstream sealing ring associated with said downstream seat and normally maintained in contact with said valve member in sealing relation therewith to provide a downstream face seal, a downstream annular space behind said downstream sealing ring;

a ring of sublimable material positioned in said upstream annular space for maintaining said upstream sealing ring in sealing relation with said valve member when said ring is in a solid state, when said ring reaches a predetermined temperature said ring sublimates into a gaseous state and passes from said upstream annular space so that said upstream sealing ring is free to move into said upstream annular space; and another ring of sublimable material positioned in said downstream annular space for maintaining said downstream sealing ring in a sealing relation with said valve member when said other ring is in a solid state, when said other ring reaches said predetermined temperature said other ring sublimates into a gaseous state and passes from said downstream annular space so that said downstream sealing ring is completely displaced into said space upon the downstream displacement of said valve member.

* * * * *